United States Patent
DeWilde

(10) Patent No.: US 6,545,593 B2
(45) Date of Patent: Apr. 8, 2003

(54) AC FILTER FOR TRUCK TRACTOR CABLE CIRCUITRY

(75) Inventor: Eric D. DeWilde, Anaheim, CA (US)

(73) Assignee: R.A. Philips Industries, Santa Fe Springs, CA (US)

( * ) Notice: Subject to any disclaimer, the term of this patent is extended or adjusted under 35 U.S.C. 154(b) by 0 days.

(21) Appl. No.: 09/978,509

(22) Filed: Oct. 15, 2001

(65) Prior Publication Data

US 2002/0070041 A1 Jun. 13, 2002

Related U.S. Application Data

(60) Provisional application No. 60/240,239, filed on Oct. 13, 2000.

(51) Int. Cl.$^7$ ............................................. H04M 11/04
(52) U.S. Cl. ............................ 340/310.01; 340/310.05; 340/310.06; 340/3.1; 701/36
(58) Field of Search ....................... 340/310.01, 310.03, 340/310.07, 310.08, 531, 538, 431, 453, 310.05, 310.06, 3.1; 303/122–123, 122.06; 701/36, 71

(56) References Cited

U.S. PATENT DOCUMENTS

| | | | | |
|---|---|---|---|---|
| 5,488,352 A | * | 1/1996 | Jasper | 340/431 |
| 5,739,592 A | * | 4/1998 | Rigsby et al. | 307/9.1 |
| 5,920,128 A | * | 7/1999 | Hines | 307/10.8 |
| 6,127,939 A | | 10/2000 | Lesesky et al. | 340/825.06 |

OTHER PUBLICATIONS

Screen print; Home page at plc4trucks.com; printed Sep. 27, 2000.
Screen print; plc4trucks.com/press/in–the–news.html; printed Sep. 27, 2000.
Sauer, Bruce; "New Power for Trailers"; trailer–bodybuilders.com; Sep. 11, 2000.
Berg, Tom; "TMC Endorses ABS Link"; Transport Topics; ttnews.com; Jun. 29, 1998.
Brandt, Chris; "FHWA Backs Off On ABS Retrofit"; Transport Topics; ttnews.com; May 11, 1998.
Richards, Paul; "ABS fault–indicator chips–Baked right in"; Commercial Carrier Journal; ccjmagazine.com; Apr. 1998.

* cited by examiner

*Primary Examiner*—Daniel J. Wu
*Assistant Examiner*—Phung T Nguyen
(74) *Attorney, Agent, or Firm*—Christie, Parker & Hale, LLP

(57) ABSTRACT

An AC signal filter useful in a truck tractor equipped with power line communication for indicating in the tractor the status of an automatic braking system (ABS) in a trailer to which the tractor can be connected. The filter comprises a first power line carrying DC power connected between the tractor battery and a tractor ABS module. A second power line carrying DC power is connected from the tractor battery to a tractor connecting to a trailer ABS module. A first inductor is coupled in the first power line to block the passage of AC signals from the tractor ABS to the tractor battery, but permit the passage of DC current from the tractor battery to the tractor ABS module. A second inductor is coupled in the first power line to block the passage of AC signals from the trailer ABS module to the tractor battery but permit the passage of DC current from the tractor battery to the trailer ABS module. A capacitor is coupled between the first and second power lines for communicating AC signals between the tractor ABS module and the trailer ABS module.

20 Claims, 4 Drawing Sheets

AC FILTER FOR TRUCK TRACTOR CABLE CIRCUITRY

CROSS-REFERENCE TO RELATED APPLICATION(S)

This application claims priority to the U.S. provisional application No. 60/240,239, filed Oct. 13, 2000.

FIELD OF THE INVENTION

The present invention pertains to the extraction and delivery of an AC signal imposed on a DC power conductor in the context of power line communication functions in heavy duty tractor and trailer combinations. More particularly, it pertains to a way to efficiently wire a truck tractor for delivery in the tractor of a signal, such as a lamp illumination signal, indicative of a malfunction of a trailer automatic braking system, which signal originates as an AC signal transmitted to the tractor over a selected DC power conductor coupled to the tractor via a standard 7-wire connector.

INCORPORATION BY REFERENCE

Attached hereto as Appendix A is Standard SAE J560, which is incorporated by reference hereinto.

BACKGROUND

For several years now, a consortium of companies have been working to meet a National Highway Traffic Safety Administration (NHTSA) mandate to provide a warning lamp in the cab of a tractor that notifies a driver of any tractor and/or trailer anti-lock brake system (ABS) malfunctions. This task initially seemed too much for traditional J560 connectors, a seven-pin connector that has been specified by the Society of Automotive Engineers (SAE), that link tractors and trailers because all seven pins of the connector were already being used to power various functions on the trailer. To remedy this problem, a number of options were suggested, including using a second J560 connector and a revised connector with more pins, but neither of these options were readily accepted by the trucking community. As a result, the PLC4Trucks (PLC) system, a computer controlled system that allows one wire to provide power for multiple functions, was developed. Trucks that incorporate the PLC system enable trailer manufactures the ability to comply with the NHTSA mandate.

The Maintenance Counsel of the American Trucking Association accepted the PLC system as the industry standard "tractor-trailer communication interface" in 1998. The PLC system utilizes a multiplexing device, which uses power-line carrier technology to send signals along a wire already carrying power for another use, signals the driver of any malfunction in the ABS of a trailer he is pulling, while also allowing control of other trailer accessories. Central to the PLC system is the Intellon P485 chip, a "chirping chip" designed by Intellon, which emits a very distinct signal and serves as the brains of the PLC system. The chip is generally located in the electronic control module of the trailer ABS equipment.

PLC systems use the auxiliary circuit (the "blue wire") of the J560 connector to send messages between electrical transceiver modules located on the tractor and the trailer. The system uses the P485 chip to send a PLC signal or (chirp) from the trailer ABS electrical module that can be recognized or understood by an ABS transceiver on the tractor. When the transceiver on the tractor identifies the signal, it responds. In the case of trucks implementing the PLC system, the response is one of only two things—turn the tractor ABS status light on or turn it off. The light will stay on as long as a problems in the ABS persist and will go out if the problem stops, is fixed or if the trailer is unhooked from the tractor. The malfunction light is located in the tractor instrument panel and indicates a malfunction in the trailer's ABS.

While the PLC system provides many benefits, the same auxiliary circuit used by the PLC system to transmit PLC signals to power the trailer ABS has previously been used by many truck operators to power and operate lights, pumps, lift-gates and other devices on the trailer. Thus, as PLC signals are transmitted across the auxiliary circuit, the high frequency signals may be transmitted back to the power supply system of the tractor. If a PLC signal gets into the power supply system of the tractor, it can cause interference with electronic instruments inside the tractor cab. In order to prevent this, there is a need for a device which isolates the high frequency PLC signals applied on the trailer power supply system and prevent them from appearing in the power supply system of the tractor cab, the tractor and trailer power supply systems are linked when the trailer is connected to a trailer via electrical connectors conforming to SAE standard J560. Such a device must be cost-effective and easy to implement into existing tractor/trailer combinations.

SUMMARY OF THE INVENTION

The present invention is generally directed to low-pass filter connectable between a selected pair of DC power lines in a truck tractor to isolate an AC signal present on one of the selected power lines from other DC power lines in the tractor, and to present the AC signal to the other one of the selected power lines. All of the DC power lines are connectable to a battery in the tractor. Each of the pair of DC power lines are associated with one of an AC signal generator, an AC signal receiver, and an AC signal transceiver. The filter comprises a pair of inductors connectable in the first and second power lines so that each inductor has a battery end and an opposite end. The filter further includes a capacitor connected between the opposite ends of the inductors.

In a preferred embodiment, the filter comprises a first power line carrying DC power connected between the tractor battery and a tractor ABS transceiver. The filter also includes a second power line carrying DC power connected from the tractor battery to a tractor connection to a trailer ABS module. A first inductor is coupled in the first power line between the tractor battery and the tractor ABS module to block the passage of AC signals from the tractor ABS to the tractor battery, but permit the passage of DC current from the tractor battery to the tractor ABS transceiver. A second inductor is coupled in the second power line between the tractor battery and the tractor connection to block the passage of AC signals from the trailer ABS module to the tractor battery but permit the passage of DC current from the tractor battery to the trailer ABS module. A capacitor is coupled between the first and second power lines for communicating AC signals between the tractor ABS transceiver and the trailer ABS transceiver. An additional pair of capacitors are connected between the first and second power lines and frame ground to maintain the passage of pure DC power along the power lines between the tractor battery and the low-pass filter.

The present invention provides an improved method for preventing high frequency signals from appearing in the power supply system of the tractor and interfering with electric instruments inside the tractor cab.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION

Figure 1:
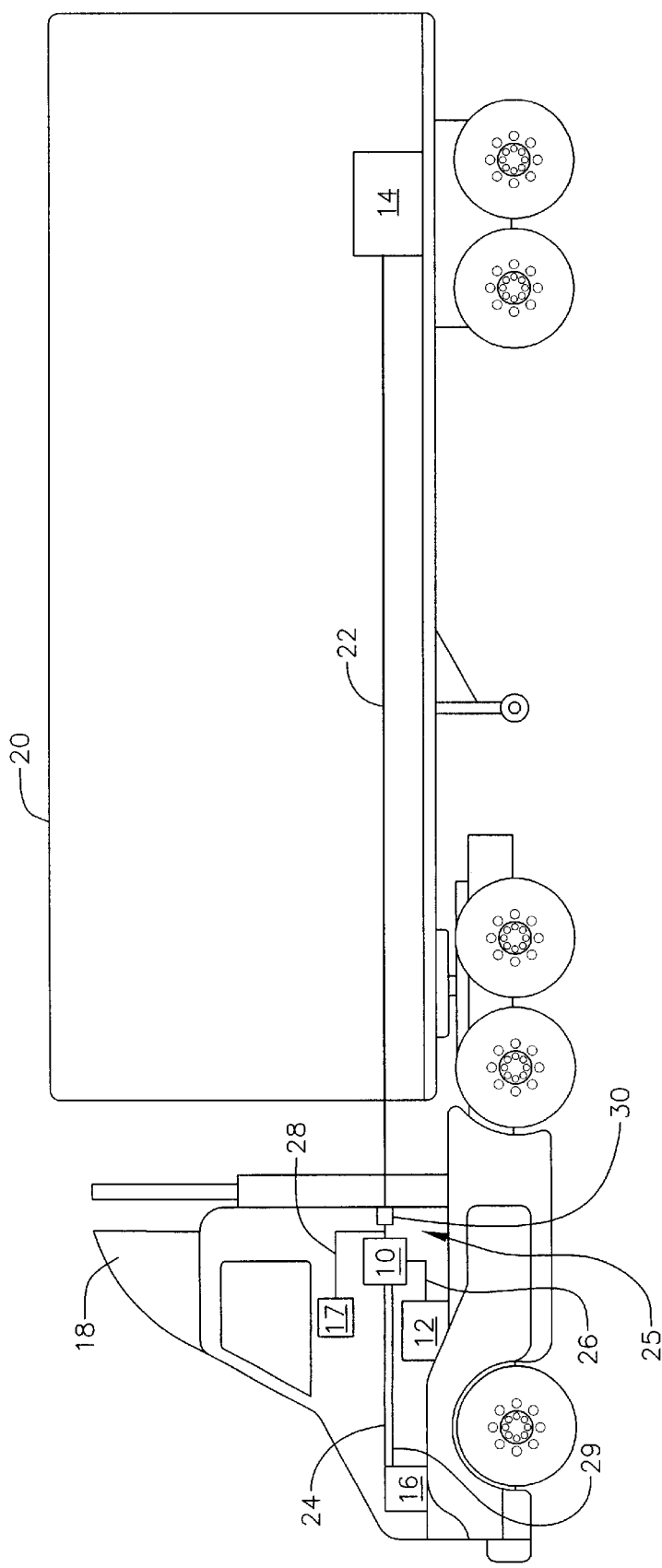
FIG. 1 is a diagram illustrating a tractor/trailer combination incorporating a low-pass filter in accordance with the present invention.

In a particularly preferred embodiment of the present invention, there is provided a low-pass filter for isolating AC communication signals that are applied to a DC power line connected between a tractor and trailer. As shown in FIG. 1, the filter 10 is placed along a power line 22, between an ABS module 12 located on a tractor 18 and an ABS module 14 located on a trailer 20. Each ABS module includes an ABS transceiver which receives and transmits communication data in the form of an AC signal. Such data includes status information about the tractor and trailer, the health of the ABS systems, and other information such as transmission state (whether the brakes are going in forward or reverse), engine temperature and the like.

The tractor further includes a wiring harness 25 that is connectible to a J560 connector mounted in the rear of the tractor cab. The J560 connector conveys electric power for lighting and other equipment operations between the tractor and the trailer. The harness incorporates the filter. The filter passes DC power from a 12V tractor battery 16 to the tractor and trailer ABS modules and other tractor auxiliaries 17, while blocking AC signals applied to the DC power line. The AC signal communicates ABS status information between the tractor ABS module and the trailer ABS module, and the filter prevents the AC signals from passing along either relevant power line back to the tractor battery and hence, to other tractor and trailer systems that draw power from the tractor battery.

Figure 2:
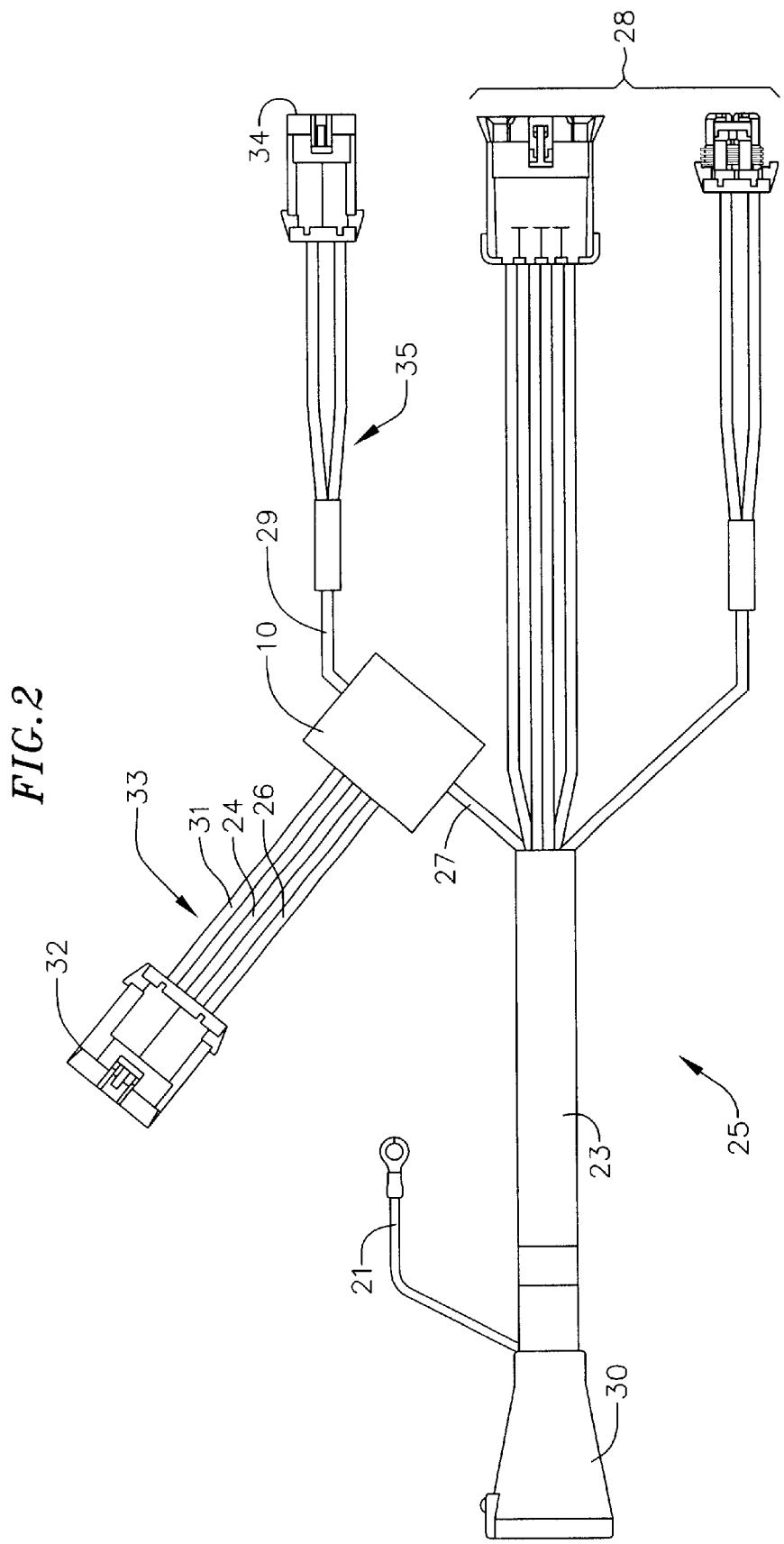
FIG. 2 illustrates a tractor wiring harness comprising a filter box in accordance with the present invention.

With reference to FIG. 2, the tractor wiring harness 25 preferably comprises a socket portion 30, a J560 connector which is mountable in the rear of the tractor cab, cable 23, which includes a power line connected to the socket 30. The cable comprises a series of wires connecting to various auxiliaries within the tractor. The socket may be grounded to the tractor frame by a wire 21 connected to the socket. Persons skilled in the art will recognize that a J560 socket is mounted in the front end of the trailer, and the two sockets are interconnected by a seven-wire cable having at each end a plug which conforms to SAE J560.

The J560 connector is a seven pin connector that has been specified by the Society of Automotive Engineering (SAE) according to the standard number "SAE J560." The pins and corresponding sockets of J560 connectors are generally assigned to specific electrical subsystems or functions, for example, ground, turn signals, brake lights, clearance lamps, emergency flashers, and other devices requiring electrical signals. The seventh pin of the connector is generally an auxiliary pin which can be used for specific electrical purposes or applications on individual tractor/trailer combinations. The power line that drives the trailer brake lights is typically connected to the tractor by means of the seventh pin. In addition, pins and sockets of the seven-pin connector may be used to convey an ABS signal to the tractor. Specifically speaking, terminal number 7 of the J560 connector, which is identified as the "blue wire," carries DC power from the tractor battery to the ABS module of the trailer. In addition, ABS communication signals maybe applied to the blue wire to communicate brake status information between the ABS modules of the tractor and trailer.

In a presently preferred embodiment, the filter 10 is incorporated into the wire harness 25 along the blue wire 27 which supplies power to the trailer 14 ABS module. The filter is also connected between the tractor battery and the tractor and trailer ABS modules via wire bundles 33 and 35. Wire bundle 33 supplies power from the tractor battery to the tractor ABS module and comprises a first "yellow" wire 26, which connected between the tractor ABS module and the filter box, a second "yellow" wire 24, which is connected between the tractor battery and the filter box, and a "ground" wire 31, which is connected between the filter box and the tractor frame. The wire bundle 33 includes a connector 32, for example, a Packard 12040977 connector, at one end and is connected to the filter box at an opposite end. The connector may be coupled to a circuit connected to the tractor battery to apply DC power to the yellow wires 24 and 26. In accordance with the present invention, DC power is supplied to the tractor ABS module from the tractor battery 16 via the yellow wire 24 to the filter box. 12V DC power is when passed from the filter to the tractor ABS module via yellow wire 26. ABS communication signals maybe applied to yellow wire 26 from the tractor ABS transceiver, but the filter prohibits the AC signal from passing along the yellow wire 24, back to the tractor battery.

Blue wire 27 and wire bundle 35 supply power from the tractor battery to the trailer ABS module. Wire bundle 35 includes a blue wire 29 that is coupled to the filter box at one end and connected to an electrical connector 34 at an opposite end. The electrical connector 34 may preferably connect to a circuit coupled to the tractor battery. Thus, wire bundle 35 passes DC power to the filter from the tractor battery. Blue wire 27, then passes DC power from the filter to the trailer ABS module, via the J560 connector. ABS communication signals may be applied to blue wire 27 from the trailer ABS transceiver, but the filter prohibits the AC signal from passing to wire bundle 35 and back to the tractor battery.

Figure 3:
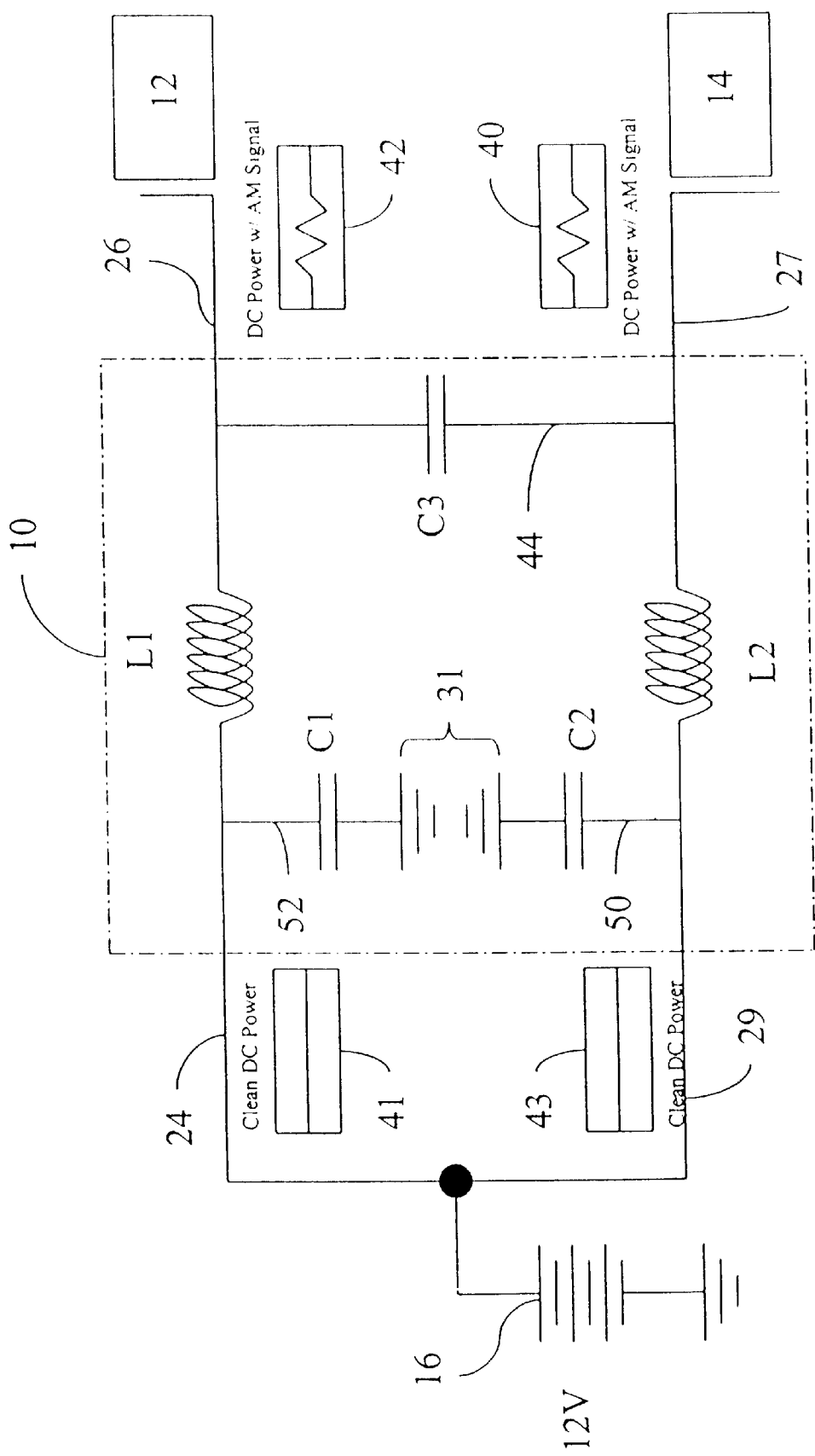
FIG. 3 is a electrical schematic diagram of a preferred embodiment of the low-pass filter electrical circuit in accordance with the present invention.
Figure 4:
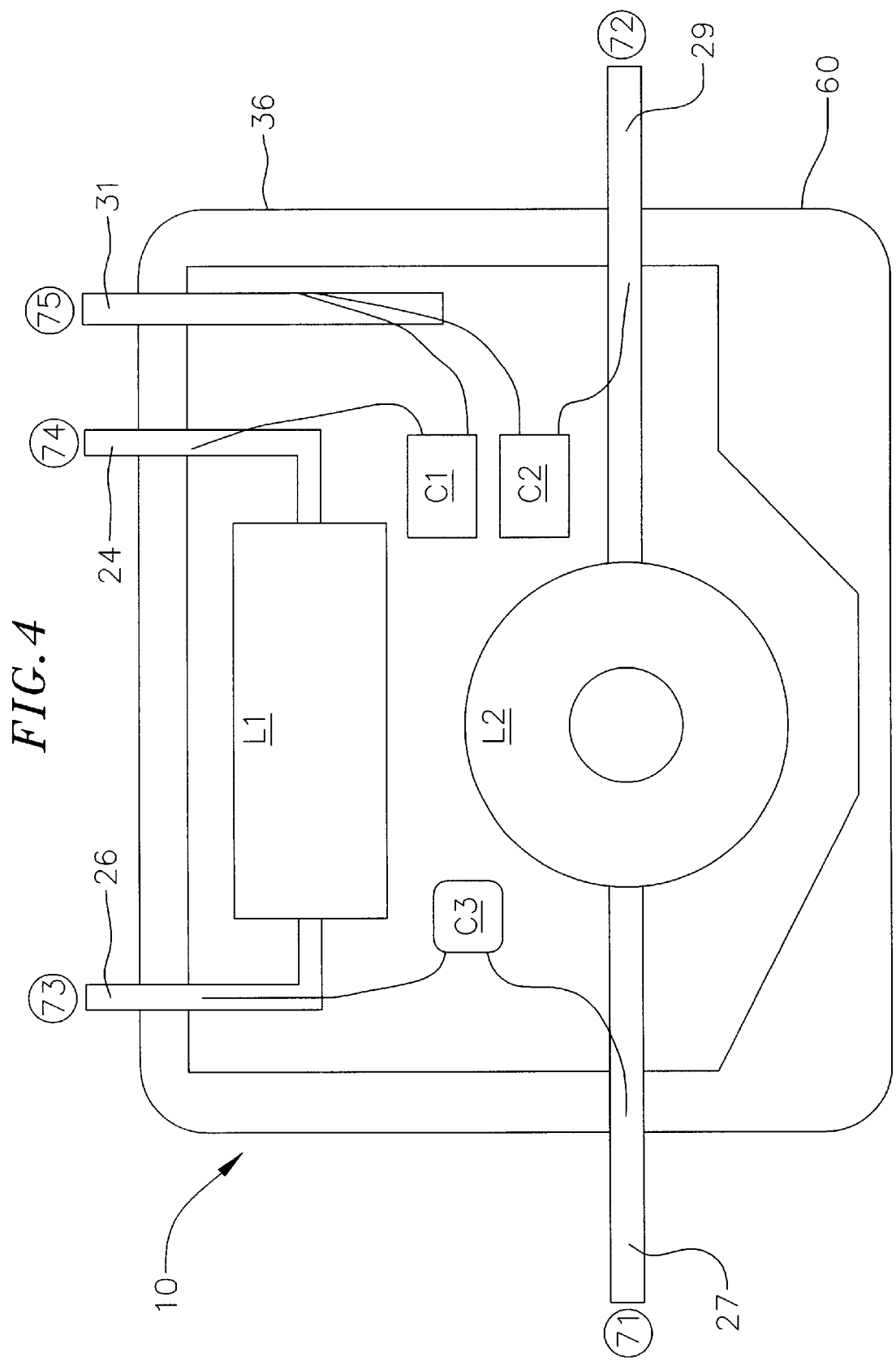
FIG. 4 is a diagram illustrating the components of the low-pass filter in FIG. 3.

As shown in FIGS. 3 and 4, the filter 10 is a LC circuit, comprising a pair of inductors L1 and L2, and a capacitors C1, C2 and C3. The filter, as described above, is also connected between yellow wires 24 and 26, blue wires 27 and 29 and ground wire 33. In a preferred embodiment, the capacitor C3, preferably having a value of about 1 $\mu$F, is coupled in parallel between blue and yellow wires 27 and 26, which are connected to the ABS modules of the trailer and tractor, respectively. In accordance with the present embodiment, the capacitor C3 functions as a low impedance AC conductor to pass AC communication signals between the tractor and trailer ABS transceivers. The inductor L2, preferably having a value of about 10 $\mu$H at 30 A, is coupled in series between the blue wires 27 and 29 and functions as a low-pass filter which passes DC power from the tractor battery to the trailer ABS module, while blocking high frequency AC communication signals passed from the trailer ABS transceiver back towards the tractor battery.

The inductor L1, preferably having a value of about 10 $\mu$H at 20 A, is coupled in series between the yellow wires 26 and 24 and functions as a low-pass filter which passes DC power from the tractor battery to the tractor ABS module, while blocking high frequency AC communication signals passed from the tractor ABS transceiver back towards the tractor battery.

The capacitor C2, preferably having a value of about 10 $\mu$F, is coupled between the blue wire 29 and ground wire 31 to function as a low impedance AC conductor for any high frequency signals applied to the blue wire 29 between the filter and tractor battery. The high frequency signals are routed from the blue wire 29, thru the capacitor C2 to frame ground. Similarly, the capacitor C1, preferably having a value of about 10 $\mu$F, is coupled between yellow wire 24 and ground wire 31 to function as a low impedance AC conductor for any high frequency signals applied to the yellow wire 24 between the filter and tractor battery. The high frequency signals are routed from the yellow wire 24, thru the capacitor C1 to frame ground.

As depicted schematically in FIG. 4, the filter 10 may be enclosed within a filter box 60 having a plurality of terminals 71–75. Terminal 71 is a power output terminal that is coupled to the blue wire 27 connected to the trailer ABS power input via the J560 socket 30 (FIG. 2). Terminal 72 is a power input terminal that is coupled to the blue wire 29 connected to the tractor battery. Terminal 73 is a power output terminal that is coupled to the yellow wire 26 connected to the tractor power input on the tractor ABS. Terminal 74 is a power input terminal that is coupled to the yellow wire 24 connected to the tractor battery and terminal 75 is a ground terminal coupled to the ground wire 31.

Generally, the transceiver in the trailer ABS module is responsible for generating the PLC AC communication signals that provide status information about the trailer ABS to the instrumentation in the trailer. The transceiver in the tractor ABS module is generally responsible for reading the PLC signal and turning on an ABS status light in the dashboard of the tractor. The status light generally indicates a malfunction or other information about the trailer ABS.

During operation, as illustrated in FIG. 3, the trailer ABS transceiver sends a PLC signal 40 to the tractor ABS transceiver. The coupling capacitor C3 between the tractor ABS yellow wire or power line 26 and the trailer blue wire or power line 27 passes the PLC signal from the trailer blue wire to the tractor yellow wire, while the inductor L2 blocks the high frequency PLC signal from passing through the filter to the blue wire 29 coupled to the tractor battery. Thus, clean DC power 43 is maintained along the power line between the tractor battery and the filter. Furthermore, if high frequency signals are present on along the blue wire 29, these signals are routed to "ground" via capacitor C2.

Conversely, the tractor ABS transceiver may communicate with the trailer ABS transceiver (i.e., PLC signal 42). In this instance, the coupling capacitor C3 passes the signal from the tractor yellow wire to the trailer blue wire, while the inductor L1 blocks the high frequency signal from passing through the filter to the yellow wire 24 coupled to the tractor battery. Thus, clean DC power 41 is maintained along the power line between the tractor battery and the filter. Moreover, if high frequency signals are present on along the yellow wire 24, these signals are routed to "ground" via capacitor C1. Thus, the filter prevents any PLC signals from getting into the power supply system of the tractor and interfering with the electronic instruments in the tractor cab.

The filter of the present invention is preferably incorporated into the tractor wiring harness and coupled between the tractor and trailer power lines at a location as close as possible to the tractor ABS transceiver and the J650 connector receptacle in the rear of the tractor cab. In this desired location, PLC signals will be prevented from having an opportunity to cross-couple or radiate out of the harness into other auxiliary wires connected to the tractor battery.

The preceding description has been presented with reference to presently preferred embodiments of the invention. Workers skilled in the art and technology to which this invention pertains will appreciate that alterations and changes in the described structure may be practiced without meaningfully departing from the principal, spirit and scope of this invention.

Accordingly, the foregoing description should not be read as pertaining only to the precise structures described and illustrated in the accompanying drawings, but rather should be read consistent with and as support to the following claims which are to have their fullest and fair scope.

What is claimed is:

1. A filter connectable between selected first and second DC power lines in a truck tractor to isolate from other DC power lines in the tractor an AC signal present on one of the selected power lines and to present the AC signal to the other one of the selected power lines, all DC power lines being connectable to a battery in the tractor, each of the first and second DC power lines being associated with one of an AC signal generator, an AC signal receiver, and an AC signal transceiver, the filter comprising first and second inductors respectively connectable in the first and second power lines so that each inductor has a battery end and an opposite end, and a capacitor connected between the opposite ends of the inductors.

2. A filter according to claim 1 including a pair of further capacitors connected respectively to the battery end of a respective inductor and connectable to a ground connection in the tractor.

3. A filter according to claim 1 in which the AC signal is indicative of the status of an automatic braking system in a trailer coupled to the tractor and the first DC power line is a power line to a controller in that braking system.

4. A filter according to claim 3 in which the second DC power line is a power line to a braking system status indicator in the tractor.

5. A filter according to claim 3 in which the first DC power line is coupled to a J560 connector connectable to the rear of the tractor cab.

6. A filter according to claim 5 in which the first DC power line is connected to the auxiliary circuit of the J560 connector.

7. A filter unit connectable in and between selected first and second ones of plural DC power lines in a truck tractor to isolate from others of the power lines AC signals present on one of the selected lines and to apply AC signals on the one selected line to the other selected line, the filter unit comprising first and second of input terminals and first and second output terminals, a pair of inductors connected respectively between the first input and output terminals and the second input and output terminals, and a capacitor connected between the output terminals, the filter unit being connectable in the first and second power lines with its input terminals functionally disposed toward a battery in the tractor.

8. A filter unit according to claim 7 including a ground terminal, and a pair of capacitors each of which is connectable between a respective input terminal and the ground terminal.

9. A filter unit according to claim 7 in which the first and second power lines provide power to first and second AC signal transceivers.

10. A filter unit according to claim 9 in which signals generated by the transceivers pertain to an automatic braking system in a trailer to which the tractor can be coupled.

11. An AC signal filter useful in a truck tractor equipped with power line communication for indicating in the tractor the status of an automatic braking system (ABS) in a trailer to which the tractor can be connected, the filter comprising:
- a first power line connected between the tractor battery and a tractor ABS transceiver, the first power line carrying DC power;
- a second power line connected from the tractor battery to a tractor connection to a trailer ABS transceiver, the second power line carrying DC power;
- a first inductor coupled in the first power line between the tractor battery and the tractor ABS transceiver to block the passage of AC signals from the tractor ABS transceiver to the tractor battery, but permit the passage of DC current from the tractor battery to the tractor ABS transceiver;
- a second inductor coupled in the second power line between the tractor battery and the tractor connection to block the passage of AC signals from the trailer ABS transceiver to the tractor battery but permit the passage of DC current from the tractor battery to the trailer ABS tranceiver; and
- a capacitor coupled between the first and second power lines for communicating AC signals between the tractor ABS transceiver and the trailer ABS transceiver.

12. A filter according to claim 11 including a pair of further capacitors connected respectively to a respective inductor and connectable to a ground connection in the tractor.

13. A filter according to claim 11 in which the first power line is a power line to a controller in the trailer ABS.

14. A filter according to claim 13 in which the second DC power line is a power line to a braking system status indicator in the tractor.

15. A filter according to claim 13 in which the first power line is coupled to a J560 connector connectable to the rear of the tractor cab.

16. A filter according to claim 15 in which the first power line is connected to the auxiliary circuit of the J560 connector.

17. A method of filtering AC communication signals indicating in a tractor the status of an automatic braking system (ABS) in a trailer connectable to the trailer, the method comprising the steps:
- providing a filter comprising a first power line carrying DC power connected between the tractor battery and a tractor ABS transceiver, a second power line carrying DC power connected between the tractor battery and a tractor connection to a trailer ABS transceiver, a first inductor coupled in the first power line between the tractor battery and tractor ABS transceiver, a second inductor coupled in the second power line between the tractor battery and the tractor connection, and a capacitor coupled between the first and second power lines;
- applying a high frequency AC signal to the second power line, the AC signal being transmitted to the filter from the trailer ABS transceiver;
- blocking the high frequency AC signal applied to the second power line from passing through the filter to the tractor battery, while permitting the passage of DC current from the tractor battery to the trailer ABS transceiver;
- passing the high frequency AC signal applied to the second power line to the first power line;
- blocking the high frequency AC signal passed to the first power line from passing through the filter to the tractor battery, while permitting the passage of DC current from the tractor battery to the tractor ABS transceiver.

18. The method of claim 17 in which the AC signal applied to the second power line is blocked by the second inductor.

19. The method of claim 17 in which the AC signal passed from the second power line to the first power line via the capacitor.

20. The method of claim 19 in which the AC signal passed to the first power line is blocked by the first inductor.

* * * * *

UNITED STATES PATENT AND TRADEMARK OFFICE
CERTIFICATE OF CORRECTION

PATENT NO. : 6,545,593 B2
DATED : April 8, 2003
INVENTOR(S) : Eric DeWilde

It is certified that error appears in the above-identified patent and that said Letters Patent is hereby corrected as shown below:

Column 6,
Line 56, delete "of".

Signed and Sealed this

Twentieth Day of April, 2004

JON W. DUDAS
*Acting Director of the United States Patent and Trademark Office*